United States Patent [19]

Robinson et al.

[11] Patent Number: 4,796,942
[45] Date of Patent: Jan. 10, 1989

[54] ANCHORING OF TRUCK BED LINERS

[75] Inventors: Bernard L. Robinson, Coleman; George L. Pickard, Beaverton, both of Mich.

[73] Assignee: Homestead Products, Inc., Coleman, Mich.

[21] Appl. No.: 80,667

[22] Filed: Aug. 3, 1987

[51] Int. Cl.⁴ ............................................. B62D 33/00
[52] U.S. Cl. ................................. 296/39.2; 411/169; 411/427; 411/435; 411/972; 220/325
[58] Field of Search ............... 296/39 R, 193; 224/42.42 R; 411/427, 435, 972, 169; 180/69.24; 220/325

[56] References Cited

U.S. PATENT DOCUMENTS

| | | | |
|---|---|---|---|
| 4,181,349 | 1/1980 | Nix et al. | 296/39 R |
| 4,540,214 | 9/1985 | Wagner | 296/39 R |
| 4,572,568 | 2/1986 | Kapp et al. | 296/39 R |
| 4,595,229 | 6/1986 | Wagner | 296/39 R |
| 4,707,021 | 11/1987 | Meier et al. | 180/69.24 |

Primary Examiner—Robert B. Reeves
Assistant Examiner—Brian Sells
Attorney, Agent, or Firm—Learman & McCulloch

[57] ABSTRACT

A fastener especially adapted for securing a liner in a pickup truck cargo box and having a bolster at the upper ends of its walls provided with flanges at its inner edge. The fastener comprises a rotatable bolt having a head at one end and an anchor member at its other end through which the bolt threadedly extends. The anchor member may be rotated with the bolt but is of such length as to engage the lower surface of the bolster after limited rotation, thereby enabling continued rotation of the bolt to cause the liner to be clamped between the bolt head, the bolster flange, and the anchor member. The construction is such that securing of a liner in a cargo box requires no openings to be formed in the walls of the cargo box.

13 Claims, 1 Drawing Sheet

ANCHORING OF TRUCK BED LINERS

BACKGROUND OF THE INVENTION

It presently is fairly common to place in the cargo box or bed of a pickup truck a one piece shell or liner formed of suitable plastic material. Typical examples of such liners are disclosed in Nix U.S. Pat. No. 3,881,768; Lambitz et al U.S. Pat. No. 4,047,749; and Nix et al U.S. Pat. Nos. 4,111,481; 4,181,349; 4,446,963. A liner conventionally has a bottom that seats upon the base of the cargo box, a pair of upstanding, spaced side walls extending parallel and alongside the side walls of the cargo box, and a front wall which bears against the front wall of the cargo box. The side and front walls of the liner conventionally have flanges at their upper ends which are directed outwardly of the liner so as to overlie the bolsters or sills at the upper edges of the side and front walls of the cargo box.

Although a truck bed liner may fit fairly well within its cargo box, it is necessary to secure the liner to the cargo box so as to preclude the possibility of inadvertent separation of the liner from the vehicle. Conventional methods of securing a liner to the cargo box include the drilling of holes in the liner and in either the side walls or the bolsters of the cargo box for the accommodation of screws or bolts. The drilling of holes in the cargo box is undesirable inasmuch as the holes provide a source for the commencement of rust and deterioration of the truck body.

The cargo boxes of some pickup trucks have preformed openings in the bolsters or sills at the upper edges of the front and/or side walls for the accommodation of stakes or stays. In such cases toggle-like anchor devices may be used to secure a liner to the vehicle without having to bore holes in the vehicle body. A typical form of this construction is illustrated in the aforementioned Nix et al U.S. Pat. No. 4,181,349. However, not all pickup trucks are provided with such openings in the bolsters or sills. Furthermore, it may be desirable to provide a greater number of anchoring devices than there are such openings.

Other examples of anchoring devices for a truck bed liner are shown in Wagner U.S. Pat. No. 4,595,229. The anchor members disclosed in this patent are exceedingly difficult, if not virtually impossible, to apply to a vehicle and liner assembly.

A further example of a truck bed liner anchoring device is disclosed in application Ser. No. 682,677, now abandoned.

SUMMARY OF THE INVENTION

A truck bed liner fastener constructed in accordance with the invention is adapted for use in securing a liner of the general type referred to above to the upstanding front and/or side walls of a pickup truck cargo box having bolsters at their upper ends which project inwardly toward the interior of the cargo box. Each bolster has an upper, generally horizontal ledge which conventionally terminates in a short, substantially vertical flange at the lower end of which is a lip that may be substantially parallel to and spaced a short distance below the ledge. The liner has front and side walls which bear against the corresponding walls of the cargo box and the liner walls are provided with a desired number of openings at a level adjacent, but slightly below the level of the lip.

A threaded bolt shank extends through each opening and terminates at one end in an enlarged head. One end of an elongate anchor member is threaded onto the shank at that end of the latter opposite the head. The length of the anchor member is greater than the length of the flange which spans the ledge and the lip, and it also is greater than the distance between the ledge and the opening in the liner wall through which the bolt shank extends. It thus is impossible for the anchor member to rotate through 360° when it is applied to the bolt shank and occupies a position beneath the ledge.

The opening in the liner through which the bolt shank extends preferably is of greater diameter than that of the shank, thereby enabling manipulation of the shank in such manner as to enable the anchor member easily to pass by the lip of the bolster during assembly of the liner with the vehicle. Alternatively, or in addition, the anchor member may be so configured as to enable it to engage the lip and be self-cammed to a position in which the anchor member may pass by the lip.

When the flanges of the liner are in place with respect to the cargo box bolsters, the anchor bolts may be rotated so as to cause the associated anchor members to rotate. The length of each anchor member is such, however, that the free end thereof will seat upon the inner surface of the bolster ledge and prevent further rotation of the anchor member. Continued rotation of the anchor bolt thus will cause the anchor member to move along the bolt shank until it seats firmly upon the adjacent lip and clamps the liner to the adjacent wall of the cargo box.

Preferably, the opening in the anchor member through which the anchor bolt passes is recessed for the accommodation of a reinforcing ring. A finishing ring or washer preferably is carried by the shank adjacent the bolt head and overlies the opening through the liner wall to provide a finished appearance and minimize the possibility of water passing through the opening.

THE DRAWINGS

Preferred embodiments of the invention are illustrated in the accompanying drawings, wherein.

DETAILED DESCRIPTION

Figure 1:
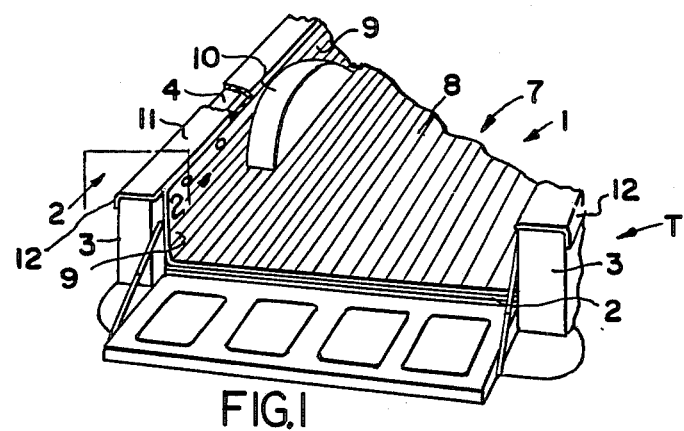
FIG. 1 is a fragmentary, isometric view of the cargo box of a typical pickup truck and provided with a liner secured by fasteners constructed in accordance with the invention.

Apparatus constructed in accordance with the invention is adapted for use with the cargo box 1 of a conventional pickup truck T. The cargo box has a horizontal bed 2, opposed, parallel, spaced apart side wall 3, and a front wall (not shown). Each side wall 3 normally has two layers 3a and 3b of metal spaced apart from one another to form inner and outer wall sections, but such layers are secured to one another in face-to-face engagement at their upper ends to form a sill or bolster comprising a substantially horizontal ledge 4 which extends inwardly in a direction toward the interior of the cargo box and is joined at its inner end to a short, downwardly turned flange 5 terminating at tis lower end in a lip 6 which extends in a direction outwardly of the cargo box toward the wall 3 and substantially parallels the ledge 4. The front wall of the cargo box may comprise only a single wall thickness, or it may be constructed in a manner similar to the side walls.

The bed 2 and the side walls 3 of the cargo box are provided with wells for the accommodation of the adjacent rear wheels of the truck, as is common.

A liner 7 formed of a pliable plastic material, such as polyethylene, is fitted into the cargo box and has a bottom 8 provided with spaced apart, upstanding side walls 9 which confront and extend alongside the associated cargo box side walls 3. The liner 7 also includes an inner front wall (not shown) which confronts and extends alongside the front wall of the cargo box, as is usual. The bottom and side walls of the liner are provided with recesses 10 for the reception of the wells in the cargo box which accommodate the vehicle wheels.

The upper edge of the liner side wall 9, as well as the front wall, is provided with a flange 11 adapted to overlie the bolster ledge 4. If desired, the flange 11 may terminate in a short, depending flange 12 which overlies the outer, upper edge of the vehicle wall 3.

Each of the liner side walls 9 is provided at intervals with an opening or aperture 13 at a level adjacent that of the lip 6. The liner front wall may be provided with similar apertures if desired, but such apertures in the front wall are not necessary unless the front wall of the liner is to be secured to the front wall of the cargo box.

A fastener constructed in accordance with one embodiment of the invention is designated generally by the reference character 14 and comprises a steel bolt 15 having a threaded shank 16 at one end of which is an enlarged head 17 provided with a conventional or phillips screwdriver slot. The fastener also includes an anchor member 18 comprising an elongate body 19 having tapered side edges 20 and, at one end 21, a threaded bore 22 adapted to accommodate the shank of the bolt. The end 21 has a beveled edge 23. The body 19 is provided with elongate, upstanding, reinforcing ribs 24 on its smaller area surface which extend to the free end 25 of the body. The bolt extends through the opening 22 in the body so that the larger area surface thereof confronts the bolt head 17. The edges 20 and 23 thus taper or are inclined in a direction away from the bolt head.

Preferably, the bore 22 is encircled by an annular recess 26 for the accommodation of a steel reinforcing ring 27 which encircles the bolt shank 16 and is freely slideable thereon. The thickness of the ring 27 corresponds substantially to the depth of the recess. The use of the steel reinforcing ring enables forces imposed thereon to be distributed over a relatively large area, thereby enabling the body 19 to be formed from a moldable plastic material, such as fiberglass reinforced nylon.

It is preferred that a finishing ring 28 be carried by the bolt shank 16 adjacent the head 17. Preferably, the ring has a cavity 29 in which the bolt head is accommodated.

When it is desired to install the liner 7 in the cargo box of a pickup truck T, the apertures 13, if not already provided in the liner side walls 9, should be formed at a level corresponding generally to the level of the bolster lip 6. The diameter of each aperture 13 should be greater than the diameter of the bolt shank 16 and preferably is about 1.5–1.75 times that of the shank 16. The finishing ring 27 may be assembled on the shank 16 adjacent the head 17 and the shank thrust through the opening 13. Thereafter, the reinforcing ring 27 and the anchor member 18 may be fitted onto the shank 16 as shown in FIG. 2.

Figures 2, 3:
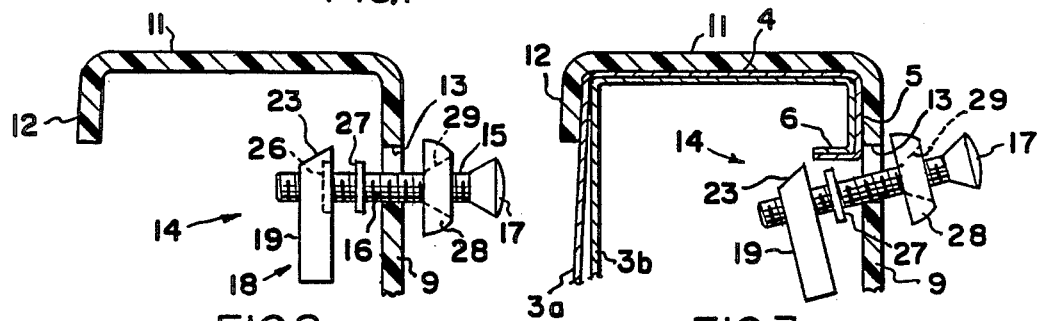
FIG. 2 is a sectional view taken on the line 2—2 of FIG. 1, but omitting the side wall of the cargo box and illustrating the relative positions of the fastener and the liner prior to securing the latter to a cargo box side wall.
FIG. 3 is a sectional view similar to FIG. 2, but illustrating the liner within the cargo box.
Figure 4:
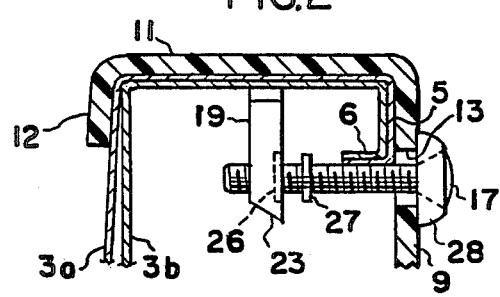
FIG. 4 is a view similar to FIG. 3, but illustrating the fastener in a position ready to clamp the liner to the cargo box wall.
Figure 5:
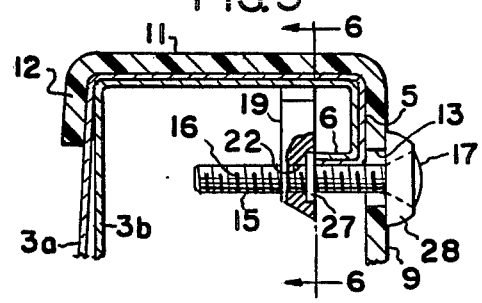
FIG. 5 is a view similar to FIG. 4 illustrating the fastener in liner-clamping condition.
Figure 6:
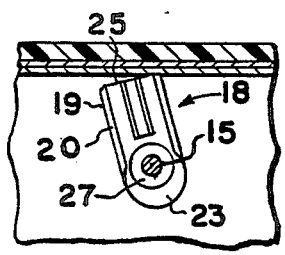
FIG. 6 is a sectional view taken on the line 6—6 of FIG. 5 in the direction of the arrow A in FIG. 5.
Figures 7, 8:
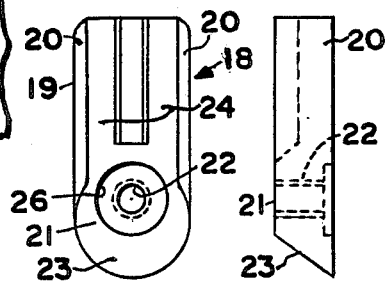
FIG. 7 is a plan view of the anchor member.
FIG. 8 is a side elevational view of the anchor member.

After the several fasteners 14 are assembled with the liner 7 in the manner shown in FIG. 2, the liner may be placed in the cargo box. The thickness of the walls 9 and the flanges 11 and 12 is such as to provide for sufficient flexibility that the walls 9 may be distorted somewhat and the flanges 11 and 12 manipulated so that the upper edge of the liner embraces the upper edge of the bolster. As the walls 9 move toward the side walls 3, the body 19 of the anchor members will engage the bolster flange 5. The inclined or tapered surfaces 20, 23 of the body, coupled with the oversize diameter of the apertures 13, will cause the bolt shank 16 to be cammed downwardly by the flange 5 thereby enabling the body 19 to pass by the flange, as is shown in FIG. 3. As the shank is cammed downwardly, it can exert a downward force on the side wall 9 so as to help seat the liner bottom on the bed of the cargo box. Thereafter, the bolt 15 may be manipulated so that its shank 16 assumes a substantially horizontal position, as is shown in FIG. 4.

Rotation of the bolt 15 will cause corresponding rotation of the anchor member 18. The length of the body 19, however, is greater than the distance from the opening 13 to be horizontal ledge 4 of the bolster. After some rotation of the body member 19, therefore, its free end 25 will engage the lower surface of the ledge 4 and preclude further rotation of the body member. Continued rotation of the bolt 15, therefore, will cause the head 17 to move along the bolt shank in a direction toward the body 19. Rotation of the bolt 15 may continue until the body member 18 seats on the lip 6 of the flange 5, whereupon the reinforcing ring 27 will seat in the recess 26 and the finishing ring 29 will seat firmly against the liner wall 9. The liner thus will be clamped against the flange 5 between the bolt head 17 and the body member 18 and securely maintained in place in the cargo box.

Figure 10:
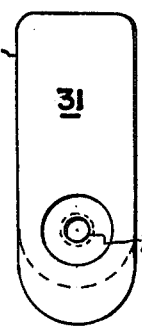
FIG. 10 is a plan view of a modified anchor member.
Figures 11, 12:
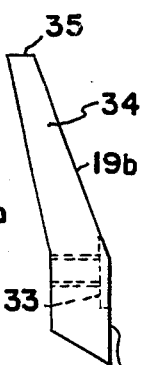
FIG. 11 is a side elevational view of the embodiment shown in FIG. 10.
FIG. 12 is a side elevational of another modified anchor member.
Figure 9:
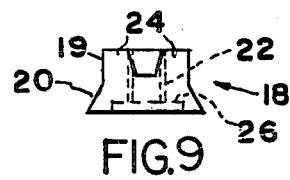
FIG. 9 is an end elevational view of the anchor member.

The embodiments shown in FIGS. 10 and 11 are similar to the earlier described embodiment and differ from the latter primarily in that the body member 19a has one flat surface 30 and an opposite surface 31 that is inclined toward that end of the body remote from the threaded opening 22a.

The embodiment shown in FIG. 12 is similar to that shown in FIG. 10, but differs therefrom in that the body 19b has one end 32 provided with a threaded bore 33 and an angular extension 34 which tapers toward its free end 35.

The embodiments of FIGS. 10–12 function like the earlier described embodiment, but make it possible for either construction to be used with vehicles having bolster lips 6 of greatly different length.

The discloseted embodiments are representative of the presently preferred form of the invention, but are intended to be illustrative and not definitive thereof. The invention is defined in the claims.

We claim:

1. A fastener for use in securing a liner side wall to a pickup truck cargo box having a wall terminating at its upper end in a transverse sill joined to a depending flange, said side wall having an aperture therein at a level below that of said flange, said fastener comprising a bolt having a cylindrical, threaded shank extending through said aperture and terminating at one end in an enlarged head; and an elongate anchor member having a correspondingly threaded bore adjacent one end thereof and through which said shank extends, said anchor member being rotatable with and relative to said bolt and having a length from said bolt to the opposite end of said anchor member greater than the maximum distance between said bolt and said sill whereby conjoint rotation of said bolt and said anchor member effects engagement between said opposite end of said anchor member and said sill and prevents further rotation of said anchor member, thereby enabling said anchor member and said head to move toward one another into clamping engagement with said flange.

2. A fastener according to claim 1 wherein said bore is encircled by a recess in which a reinforcing member is accommodated.

3. A fastener according to claim 1 wherein said anchor member has tapered side edges.

4. A fatener according to claim 1 wherein said anchor member has an upstanding reinforcing rib on one side thereof.

5. A fastener according to claim 1 wherein said anchor member has at least one inclined surface extending in the direction towards said opposite end of said anchor member.

6. A fastener according to claim 5 wherein said anchor member has two opposite surfaces both of which are inclined.

7. The combination of a truck cargo box, a cargo bed liner, and at least one fastener securing said liner to said box, said box having an upstanding wall at the upper end of which is a transversely extending sill joined to a downwardly extending flange spaced from said wall, said liner having a side substantially parallel to and adjacent said wall, said side having at least one aperture therein adjacent but below the level of the lower edge of said flange, said fastener comprising a bolt extending through said aperture and having a head at one end and at its opposite end an elongate anchor member adjacent one end of which is a threaded bore threadedly accommodating said bolt, said anchor member being rotatable with and relative to said bolt, said flange occupying a position between said liner side and said anchor member and said anchor member having a length between said bore and that end of said anchor member remote from said bore greater than the maximum distance between said bolt and said sill whereby said remote end of said anchor member engages said sill and prevents conjoint rotation of said bolt and said anchor member, said liner side being clamped against said flange between said head and said anchor member.

8. The combination according to claim 7 including a recess encircling said bore and an annular reinforcing member accommodated in said recess.

9. The combination according to claim 7 wherein said anchor member has tapered side edges.

10. The combination according to claim 7 wherein said anchor member has opposite surfaces substantially parallel to one another.

11. The combination according to claim 7 wherein said anchor member is tapered.

12. The combination according to claim 7 wherein said anchor member has a flat portion at said one end thereof and a second portion extending from said flat portion at an angle thereto.

13. The combination according to claim 12 wherein said second portion is tapered.

* * * * *